Feb. 7, 1956 J. R. BUCK 2,733,605
FREQUENCY SENSITIVE SYSTEM FOR MEASURING
THE RATE OF FLUID FLOW IN A WELL BORE
Filed Jan. 26, 1951 2 Sheets-Sheet 1

JULIAN R. BUCK
INVENTOR.

BY D. Carl Richards
AGENT

Feb. 7, 1956 J. R. BUCK 2,733,605
FREQUENCY SENSITIVE SYSTEM FOR MEASURING
THE RATE OF FLUID FLOW IN A WELL BORE
Filed Jan. 26, 1951 2 Sheets-Sheet 2

JULIAN R. BUCK
INVENTOR.

BY D. Carl Richards
AGENT

United States Patent Office 2,733,605
Patented Feb. 7, 1956

2,733,605

FREQUENCY SENSITIVE SYSTEM FOR MEASURING THE RATE OF FLUID FLOW IN A WELL BORE

Julian R. Buck, Dallas, Tex., assignor, by mesne assignments, to Socony Mobil Oil Company, Inc., a corporation of New York Application January 26, 1951, Serial No. 207,866

11 Claims. (Cl. 73—204)

This invention relates to the measurement of fluid flow and is directed more particularly to an instrument for surveying well bores and similar passages to determine the rate and direction of flow of fluid therein.

This application is an improvement over the invention of applicant's co-pending application Serial No. 147,971, filed March 6, 1950, for "A System for Measuring Rate and Direction of Flow in a Passage," now U. S. Patent No. 2,675,702.

Oil wells which have penetrated several different liquid bearing horizons or strata at different levels may produce from the different horizons. It is highly important in order to obtain efficient well operation to know the rate and direction of fluid flow at different points in the well bore in order to determine the location of producing horizons. The location of pirate formations into which well fluids are being lost may be determined and the proper remedial measures taken. Additionally, it is often desirable to know the rate of fluid flow from various producing horizons to obtain the most efficient utilization of reservoir energy. In other procedures, for example in fluid flooding as practiced in secondary recovery operations, it is desirable to know the relative permeability of formations into which the fluids are dispersed in order that the effectiveness of the flood may be ascertained.

It is an object of the present invention to provide an improved system for the measurement of the rate and direction of flow of fluid in a passage such as a well bore. It is a further object of the invention to provide a system in which a voltage is produced having a frequency dependent upon the rate and direction of flow.

In accordance with the present invention and in one form thereof there is provided means for producing an oscillatory output voltage having a temperature sensitive element mounted in a path of fluid flow in a well bore for maintaining the output voltage at a frequency dependent upon the temperature of the fluid adjacent to the temperature sensitive element. Heating means in the flow path above the element raises the temperature of the fluid adjacent thereto to an elevated temperature upon energization thereof to change the frequency of the output voltage upon fluid flow from the heating means to the temperature sensitive element. A second heating means in the fluid flow path below the element similarly raises the temperature of the fluid to change the frequency of the output voltage upon flow therefrom to the temperature sensitive element. Means are provided for alternately energizing the heating means first above and then below the temperature sensitive element correspondingly to change the frequency of the output voltage in dependence upon the direction and velocity of fluid flow in the path.

For further objects and advantages of the present invention, reference may now be had to the following description taken in conjunction with the accompanying drawings in which.

Figures 1, 2:
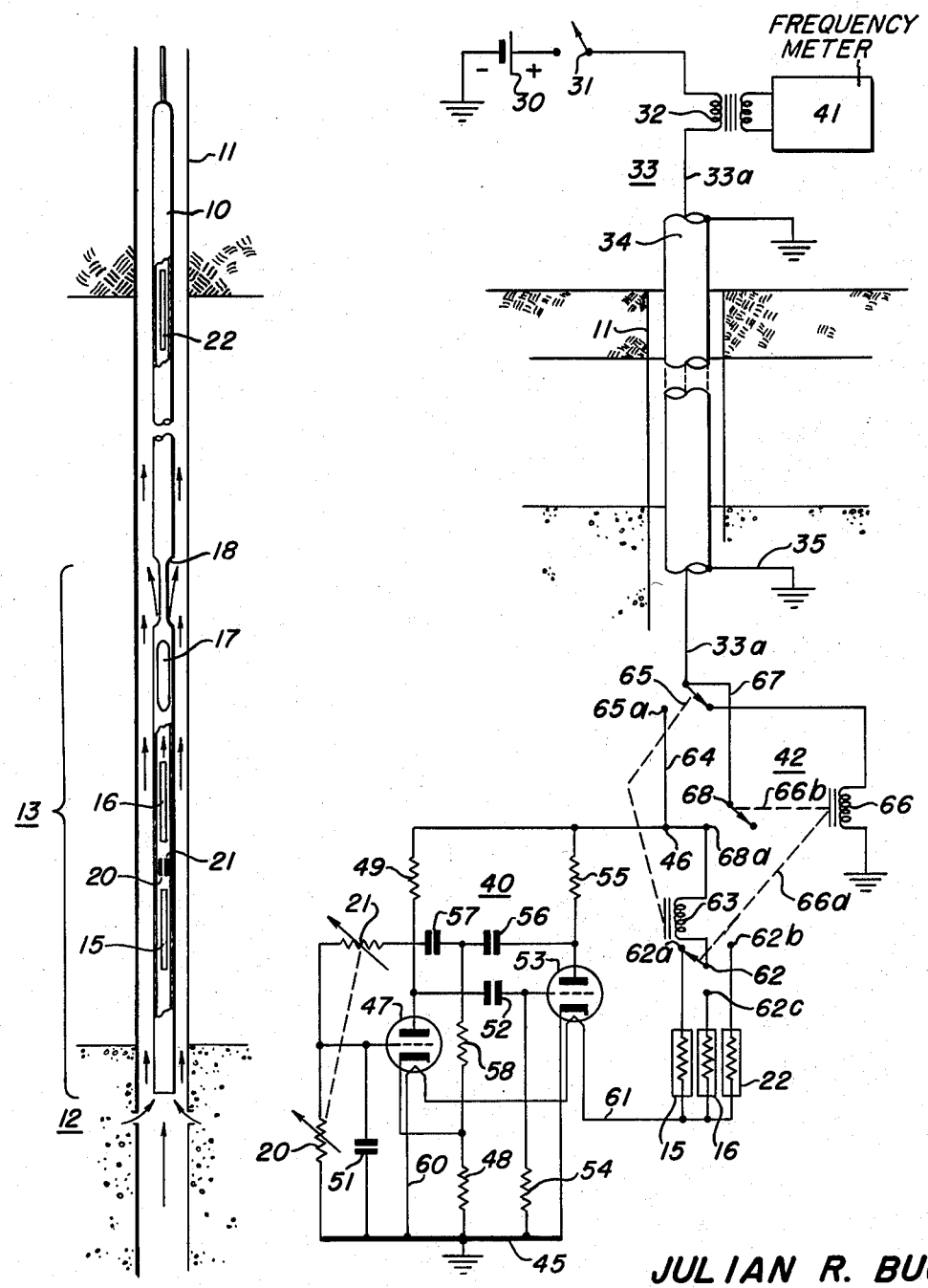
Fig. 1 is a view partially in section of the flow measuring instrument.
Fig. 2 is a schematic diagram of the temperature controlled sensing system.

Referring now to Fig. 1, there is illustrated a flow measuring instrument 10 positioned in a well bore 11 into which fluid is illustrated as entering from a porous fluid bearing section 12. In the form illustrated, the flow measuring instrument comprises an elongated slim tube having a diameter which is relatively small compared to the diameter of the bore hole 11. Two heaters 15 and 16 are spaced apart and positioned along the axis of the lower section 13 of the tubular member 10. The section 13 is open at the lower end and has apertures 17 and 18 to form a passage for flow of fluids which may pass up through the tube and out the openings 17 and 18, flowing by and over the heating elements 15 and 16. Temperature sensitive means such as elements 20 and 21 are positioned in the section 13 intermediate the heaters 15 and 16. The fluid flowing past heaters 15 and 16 operates as a heat transfer medium to vary the temperature at the location of the elements 20 and 21 in dependence upon the rate and direction of flow of fluid in the well bore. A third heating element or a resistor 22 completely insulated from well fluids by enclosing it in an upper sealed off section of the member 10 together with electronic circuits associated with the elements 20 and 21 to permit operation as hereinafter described in connection with Fig. 2. While in Fig. 1 there is illustrated by the direction of the small arrows an upward flow of fluid from the strata 12, it will be recognized that fluids from above the ports 17 and 18 in response to pressure differentials may flow down the bore hole, entering the tube at ports 17 and 18 to flow past heater 16, elements 20 and 21, heater 15 and out the lower end thereof.

In accordance with the present invention, the heaters 15 and 16 respectively above and below the temperature sensitive elements 20 and 21 are alternately energized to elevate the temperature of the fluid adjacent thereto for transfer of heat from one or the other of the heaters to the temperature sensitive elements 20 and 21, depending upon the direction of flow in the flow path inside the tube 10. The rate of flow will also determine the effect that energization of heaters has upon the temperature of the fluid as it passes the temperature sensitive elements 20 and 21. These two factors are utilized to ascertain the direction and rate of flow of the fluid in the flow path.

Referring now to the schematic circuit diagram of Fig. 2 where the elements have been given the same reference characters as in Fig. 1, there is illustrated a source of direct current generically represented by battery 30 having its negative plate connected to ground and its positive plate connected through a switch 31 and the primary winding of a transformer 32 to the center conductor 33a of a cable 33 which extends into the well bore 11. A second conductor of the cable 33, the sheath 34, is grounded at the surface of the earth and is connected to the tube 10 (Fig. 1) at its lower extremity, this connection being represented in Fig. 2 by the ground connection 35. Thus, there is provided a path for flow of direct current from the battery 30 to operate the heaters 15, 16 and 22 and to operate the associated temperature sensing network. In Fig. 2 the temperature sensing network includes a resistance-capacitance oscillator 40 in which the temperature sensitive elements 20 and 21 control the frequency of oscillation thereof. The output from the oscillator 40 may then be transmitted up-hole over the circuit formed by conductor 33a and the sheath 34 to the transformer 32, the secondary of which is connected to the input of a frequency measuring system 41. The measurement of the frequency of the output of oscillator 40 presents a unique solution to the problem of the determination of the direction and rate of fluid flow in the section 13 of tube 10.

The oscillator 40 in the form illustrated is known in the art as a resistance-capacitance oscillator using Wein Bridge regenerative feedback. Such oscillators are discussed generally in Terman's Radio Engineers' Handbook, McGraw-Hill, 1943, pp. 504-505. While other similar oscillators may be utilized, the foregoing circuit is preferred because of its relative simplicity, dependability and wide frequency range. Quite briefly, referring to the diagram of Fig. 2, the oscillator circuit connected between the ground bus 45 and the B+ terminal 46 includes a triode 47 whose cathode is connected by way of resistor 48 to ground. The anode is connected by way of resistor 49 to the B+ terminal 46. The control grid of tube 47 is connected to ground through temperature sensitive resistance 20. Capacitor 51 is connected in parallel with resistor 20. The anode of tube 47 is connected by way of condenser 52 to the control grid of a second triode 53 and the control grid is connected to the ground bus 45 by way of resistor 54. The cathode of tube 53 is connected directly to the ground bus 45 and the anode is connected by way of resistor 55 to the B+ terminal 46.

A feedback path from the anode of tube 53 is formed by condenser 56, 57 and the temperature sensitive element 21 connected in series to the control grid of the tube 47. Additionally, the point intermediate the condensers 56 and 57 is connected by way of resistor 58 to the cathode of tube 47. As is well understood by those skilled in the art, the combination of resistors 20 and 21 and condensers 51 and 57 controls the frequency of oscillation of the circuit 40. Oscillation tends to take place at a frequency $f = \frac{1}{2}\pi\sqrt{R_{20}R_{21}C_{51}C_{57}}$. With the resistors 20 and 21 positioned in the fluid flow path in the well bore and the condensers 51 and 57 of a type insensitive to temperature changes variations in the temperature of the fluid flowing adjacent resistors 20 and 21 controls the frequency of oscillation of the oscillator 40. With the resistors 20 and 21 at a given depth in the well bore, the frequency of the output of oscillator 40 is a direct measure of bore hole temperature. The oscillator 40 in combination with the heaters 15, 16 and 22 forms a system for measuring fluid flow in the bore hole.

The circuit for energizing the heaters 15, 16 and 22 by current flow from battery 30 includes the cathode heaters of tubes 47 and 53 connected in series, with one terminal of the series circuit connected by way of conductor 60 to the ground bus 45. The other terminal of the series connected cathode heaters is connected to conductor 61 which is electrically common to one terminal of each of the heaters 15, 16 and 22. The other terminals of the heaters are connected to contacts of a single-pole three-position switch 62, the armature of which is connected by way of a relay coil 63 to the B+ terminal 46. The B+ terminal 46 is connected by way of conductor 64 to terminal 65a of a single-pole double-throw switch 65. The other terminal of switch 65 is connected by way of relay coil 66 to ground. The armature of the switch 65 is connected by way of conductor 67 to the armature of a single-pole double-throw switch 68, having terminal 68a electrically common to the B+ terminal 46. The switches 65 and 68 are biased normally in the position shown in Fig. 2. When switch 31 at the surface is closed, the switches 65 and 68 are actuated in sequence, switch 68 first followed by switch 65, by flow of current in the coils 66 and 63 respectively. Switches 65 and 68 are moved from the position illustrated in Fig. 2 to circuit completing positions to place one of the heaters 15 and 16 or 22 and the oscillator 40 in operation.

More particularly, upon closure of switch 31 current flows through the circuit including conductor 33a and the relay coil 66 to ground. This energization of the relay coil 66 performs two functions. The dotted line 66a represents a mechanical connection between the relay 66 and the armature of switch 62. The dotted line 66b represents a similar mechanical coupling between the relay 66 and the armature of the switch 68. The energization of the relay coil 66 first moves the switch arm of the switch 62 from one of the three positions illustrated to another. Following this movement, a further traverse of the armature of relay 66 actuates the switch arm of the switch 68 establishing a circuit for flow of current from conductor 33a by way of conductor 67 to the B+ terminal 46. The switch 62, of the stepping type, will be moved from one of the three positions illustrated to the next position upon each closure of the switch 31 and will remain in that position until the switch 31 is opened and re-closed. This is in contrast with switches 65 and 68 which are normally biased in the position illustrated in Fig. 2 and must be held in their second position by relay action. Current also flows from conductor 33a through conductor 67, relay coil 63, a selected one of the heaters 15, 16 or 22 (depending upon the position of the armature of the switch 62), conductor 61, the heaters of the tubes 53 and 47 and then by way of conductor 60 to ground. Flow of current through the relay coil 63 actuates switch 65, moving the armature to the terminal 65a which establishes a path for current flow from conductor 33a independent of the relay 66 and its associated switch 68. With current flowing in relay coil 63, the point 46 is connected to the battery 30 and thus the oscillator 40 as well as one of the heaters is energized.

Figures 3, 4:
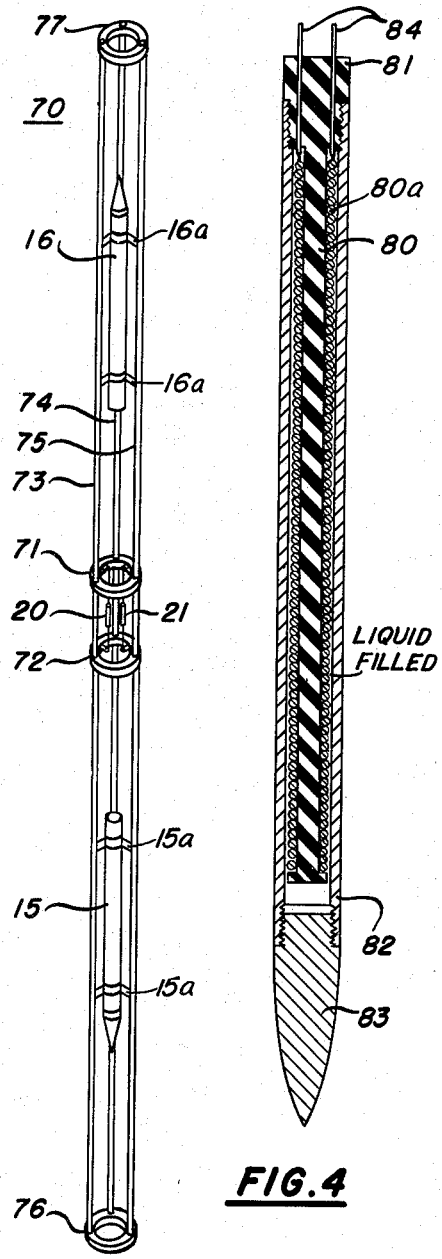
Fig. 3 is a view of the temperature sensitive elements and the associated heaters of Figs. 1 and 2.
Fig. 4 is a sectional view of one of the heaters.

Referring now to Fig. 3, the heaters together with the temperature sensitive elements are shown mounted in a framework 70 of a type that permits convenient mounting of the elements in the flow path of the section 13 of tube 10 without materially obstructing flow. More particularly, the elements 20 and 21 are supported from terminals mounted on insulating annular rings 71 and 72 which are supported by rods 73, 74 and 75. The temperature sensitive elements are positioned generally centrally of the structure. The heater 15 is supported below the temperature sensitive elements 20 and 21 by suitable fin-like spiders 15a welded or otherwise secured to the rods 73—75. Similarly, members 16a support the heater 16 above the temperature sensitive elements 20 and 21. The ends of the rods 73—75 are secured as by welding to annular rings 76 and 77. This structure may then be inserted into the lower section 13 of the tubular member 10, Fig. 1, rigidly to support the heaters and the temperature sensitive elements in substantially linear array in the flow path.

In Fig. 4 there is illustrated a sectional view of one of the heaters. An elongated thin core 80 of insulating material is provided with an enlarged end 81 which threadedly engages the upper end of a thin-walled metallic housing 82. The core 80 is wound with a plurality of turns of heater resistance wire to form a coil 80a which occupies substantially the entire annular space between the core 80 and the metallic housing 82. The lower end of the heater is fitted with an end member 83 which threadedly engages the tube 82. A heat conducting, electrically insulating liquid is placed in the cylinder 82 and acts as a transfer medium from the heater winding to the walls of the cylinder. Conductors 84 leading from heater winding are provided for connecting the heater in the selected circuit. Conductors 84 as well as elements 20 and 21 together with associated conductors preferably are coated after assembly with an appropriate oil- and brine-resistant resinous material to afford electrical insulation.

Figure 5:
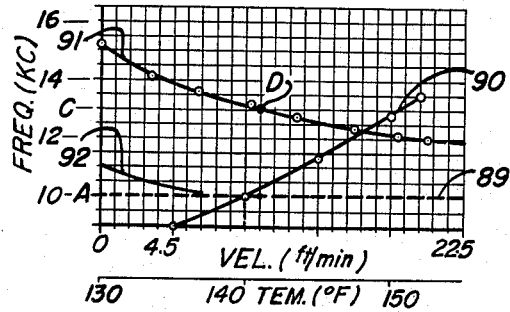
Fig. 5 is a graph of output voltage frequency as a function of fluid velocity and as a function of fluid temperature.
Figure 6:
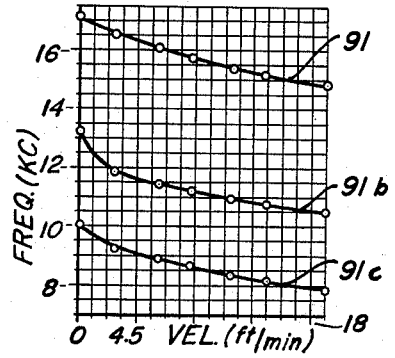
Fig. 6 is a graph of output voltage frequency as a function of velocity.
Figure 7:
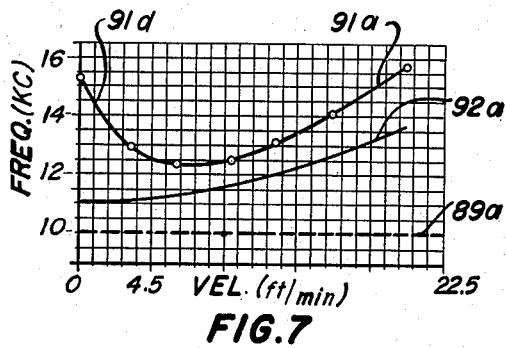
Fig. 7 is a graph of output voltage frequency as a function of velocity.

Operating characteristics of an instrument constructed in accordance with the foregoing description are illustrated in Figs. 5–7. Referring now to Fig. 5, there is illustrated a graph in which the curve 90 is a plot of the frequency of the output of the oscillator 40 as a function of the temperature of the temperature sensitive elements 20 and 21. Elements 20 and 21, preferably resistances of the negative temperature coefficient type available on the market as "Thermistors," decrease in resistance with increasing temperature. Therefore, at low temperatures the output is at a relatively low frequency, the frequency increasing as the temperature increases.

The dotted line 89 is a plot of frequency of oscillation of the circuit 40 as a function of fluid velocity when there is no heat applied to the well fluid by the heaters, i. e., when the heater 22, completely enclosed and insulated from well fluid, is energized. The frequency (A) represented by the dotted line 89 is indicative of the "normal well temperature." The curve 91 is a plot of frequency as a function of velocity of fluid traveling upward through the tube 10 when the lower heater 15 is energized. This fluid initially at the "normal well temperature" is heated as it passes the heater 15. For zero velocity, convection currents cause heat transfer from heater 15 to the elements 20 and 21; and, under zero flow, the elements 20 and 21 are at their highest temperature. The capacity of the heater 15 to raise the temperature of all fluid which passes thereby is limited so that as the velocity of fluid flow increases, the temperature, hence frequency, decreases as curve 91. In Fig. 6 there is illustrated a family of such curves, the curve 91 representing the frequency variation vs. flow where the normal well temperature is relatively high compared with the normal well temperature for either of curves 91b or 91c.

The curve 92, Fig. 5, illustrates the variation in the frequency of oscillator 40 for upward flow with the upper heater 16 energized. Since the convection currents normally flow upward, the temperature of the fluid adjacent the elements 20 and 21 is not so high for zero fluid velocity as in the case when heater 15 is energized, but there is a measurable transfer of heat downward. The upward flow of the fluid aids the convection currents in carrying heat from heater 16 upward and away from the elements 20 and 21 so that their temperature decreases for increased upward velocity. For increased flow rates the temperature asymptotically approaches the normal well temperature curve 89. The foregoing illustrates three measurements of frequency which are taken at a selected well depth to measure velocity and direction of fluid flow at that depth.

Fig. 7 illustrates the same three measurements in the presence of downward flow. The dotted line 89a corresponds with the line 89 of Fig. 5 and represents the normal well temperature. Similarly the curve 92a is a plot of frequency as a function of velocity with the upper heater 16 energized. For zero velocity, the heat of conduction and radiation produces an increased temperature at the location of the elements 20 and 21 and for increasing velocities this heat is moved downward so that the temperature of the elements 20 and 21 is increased. It will be noted that at extremely high rates of flow beyond the limits of Fig. 7, the curve 92a would change slope and return asymptotically to the dotted curve 89a. The curve 91a is a plot of frequency variation as a function of velocity when the lower heater is energized. The initial point or zero velocity point on the curve corresponds with the same point on Fig. 5. However, the curve differs from curve 91 at low flow rates since the downward flow of the fluid opposes the upward convection currents. Therefore, the portion 91d has a steeper slope than the corresponding slope of curve 91. It would be expected that at still higher velocities all the heat from heater 15 would be carried downward and away from the elements 20 and 21. However, it has been found that a different effect takes place and that the actual frequency variation, attributable to increased heat at the location of elements 20 and 21, is as illustrated by the positive slope portion of the curve 91a. This phenomena may be attributable to the geometry of the heaters in the section 13 and the position of the temeprature sensitive elements with respect thereto as they produce particular patterns of fluid flow at different velocities.

The graphs of Figs. 5 and 7 illustrate the frequency variations as a function of velocity for liquid at one initial temperature. Families of curves similar to Figs. 5 and 7 may be obtained for each temperature or a sufficient number of the curves may be obtained to interpolate for all well temperatures to be logged.

The curves of Figs. 5, 6, and 7 were obtained for a particular orientation of elements in the section 13. The slopes of the curves may be varied and the intercepts thereof may be controlled by variation in this configuration, principally by varying the axial spacing between the elements 20 and 21 and the heaters 15 and 16 with a given dissipation of power by the heaters. Similarly, variation in the power supplied the heaters 15 and 16 will vary the character of the curves. However for given flow conditions, i. e., normal fluid temperature range, velocity, and thermal conductivity, a configuration may readily be established through which curves similar to Figs. 5–7 may be obtained for use with subsequent exploratory measurements.

In utilizing the system of Figs. 1 and 2 and the analysis of the results obtained by the aid of the graphs of Figs. 5 and 7, the following procedure may be followed. The instrument of Fig. 1 may be lowered into the well bore to the depth at which the flow is to be measured. The switch 31 of Fig. 2 will be closed to initiate the following steps in the following order. First, the switch arm of switch 62 is moved from terminal 62a to 62b. Immediately thereafter and upon the same movement of the armature relay 66, the switch arm of switch 68 is moved to terminal 68a. Thereupon relay 63 is energized to move switch arm of switch 65 to terminal 65a. Heater 22 housed in the upper portion of the tube 10 is in circuit and the frequency of the output of oscillator 40 as measured by the circuit 41 is proportional to the normal temperature of the fluids at that point in the well bore. Heater 22 does not heat the well fluid, but is provided to keep the load on battery 30 and consequently the voltage on the filaments of tubes 47 and 53 at a level equal to that during succeeding measurements. With this frequency a family of curves corresponding to the normal well temperature may be selected to be used in conjunction with the two following measurements.

The first of these measurements is made after opening switch 31 and closing it again to move the armature of switch 62 from terminal 62b to 62c thereby to place in operation the heater 16 above elements 20 and 21. A second frequency will be measured by the meter 41. Thereafter the third measurement is made by opening switch 31 and reclosing it to place heater 15 in circuit with the battery 30. The third measurement of a third frequency is then obtained from meter 41.

The latter two frequency measurements may be employed to enter the family of curves selected with the first measurement. The data obtained will fit only one of the two curves, i. e., either the curve upward flow or downward flow. If when the upper heater 16 is on, the frequency A, Fig. 5, is obtained and a frequency C obtained when the lower heater 15 is on, it will be apparent that there is upward flow and that the upward flow is at a velocity represented by the point D on curve 91. This follows since the frequency A is the same frequency for normal well temperature. By this procedure any three readings may be resolved into a direct determination of the direction and the velocity of the fluid flow in the bore hole. In any case, there are produced readings of frequency at the surface of the earth that will differ one from another in dependence upon the presence of fluid flow and its direction and velocity.

It may be found preferable to obtain readings of normal well temperature throughout the entire length of the well or throughout the section to be logged and thereafter obtain measurements for corresponding depths with the upper heater 16 energized and then with the lower heater 15 energized. Such procedure will be found to be advantageous in that there is eliminated the necessity of waiting between each measurement for one heater completely to cool and the other to reach equilibrium at its operating temperature. In either case the direction and velocity of flow at any depth may be calculated from the measurements obtained.

For the purpose of illustration and not by way of limitation, a system having the following parameters was constructed and was found to operate satisfactorily. In the oscillator circuit 40 the temperature sensitive elements 20 and 21 were thermistors having a resistance of 10,000 ohms at 25° C. Thermistors marketed by the Western Electric Company, of the rod type (12A), were found to be satisfactory. Long rod-like structures are preferred since the flow passage will not be materially obstructed thereby. The frequency determining condensers 51 and 57 had a value of .0022 microfarad. Battery 30 supplied 300 volts for operation of the circuit. The coils for heaters 15 and 16 were 522 ohms each and were formed by 44 turns of No. 36 Nichrome resistance wire wound on $^5\!/_{16}''$ core or mandrill 80. The heater tubes 82 were .5 inch in diameter and 6.5 inches long and together with elements 20 and 21 were mounted in the section 13 of tubular member 10 which had an inside diameter of 1.375 inches. The element 22 housed in the upper compartment of the tube 10 was a commercial resistance of 522 ohms. Alternatively a heater element identical with elements 15 and 16 may be utilized as element 22 but since heat transfer to the surrounding medium is not requisite and is in fact to be avoided, the resistor element may be utilized.

The device 41 responsive to the output of the oscillator 40 in general may be any meter that will measure accurately the number of cycles of the output from oscillator 40 per unit time. In one form it may comprise an oscilloscope with an accurately calibrated variable frequency oscillator for driving one pair of deflecting plates with the signal from transformer 32 applied to the second pair of deflecting plates. By the observation of Lissajou pattern, the frequency may be determined. Further, frequency meters presently available on the market may be employed. However, a preferred form of measuring device for use with applicant's well logging system is illustrated and described in application to Phillip M. Green, Serial No. 207,995, filed January 26, 1951, for an Electromechanical Interval Timer now Patent No. 2,645,767. The latter system utilizes an RCA interval timer, type WF–99C, together with accurately spaced control pulses. This latter system is preferred since high accuracy is required in the frequency measurements. Through the use of the latter system where a frequency variation of one cycle per second in signals having a mean frequency in the range of from 10 to 20 kilocycles per second is, observable, minute changes in fluid velocity of the order of .003 foot per minute may be measured. The more accurate the measurement of frequency, the greater will be the detail in which well performance may be delineated.

Figure 8:
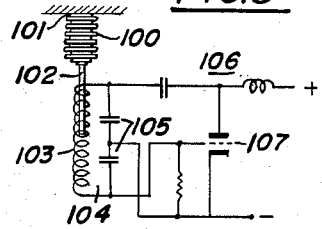
Fig. 8 illustrates an alternative form of temperature sensitive element.

While a particular modification of the invention has been illustrated and described in detail, it will be apparent that other modifications may be made without departing from the scope and spirit of the appended claims. For example, the oscillator 40 is but one type of a number of oscillators that may be utilized. A bellows type sensing element controlling a magnetic core as a frequency determining element of an equivalent oscillator could be used in place of the elements 20 and 21. A suitable bellows type sensing element is illustrated in Fig. 8 together with a suitable oscillatory device responsive thereto. A bellows 100 may be supported from end 101 in or adjacent a flow channel such as the frame 70 of Fig. 3. A rod 102 of magnetic material is supported by and extends from the free end of the bellows 100 into a coil 103. Coil 103 forms a part of a tank circuit 104 comprised of coil 103 and condensers 105. The tank circuit 104 may be the frequency controlling circuit of a suitable oscillatory circuit such as the Colpitts oscillator 106 wherein the upper end of the tank circuit 104 is coupled to the anode of a triode 107, the lower end of the tank circuit is coupled to the grid and the point intermediate condensers 105 is connected to the cathode. Variations in the inductance of coil 103 as caused by variations in the length of the bellows 100 will produce variations in the frequency of oscillations of the oscillator 106 which are therefore dependent upon variations in the temperature of well fluids as they flow past the bellows 100. Other such modifications will now be apparent to those skilled in the art.

What is claimed is:

1. A system for generating a measurable signal controlled by the rate and direction of flow of fluid in a passage comprising means for producing an oscillatory output voltage having a temperature sensitive element mounted in a path of fluid flow in said passage for maintaining said output voltage at a frequency dependent upon the temperature of said fluid adjacent thereto, heating means positioned in said path displaced from said element to raise fluid adjacent thereto to an elevated temperature upon energization thereof and to change said frequency upon heat transfer by way of said fluid therefrom to said element, heating means in said path on the side of said element opposite the first heating means to raise fluid adjacent thereto to an elevated temperature upon energization thereof to change said frequency upon heat transfer by way of said fluid to said element, and means for selectively energizing one or the other of said heating means to change said frequency in dependence upon the direction and velocity of fluid flow in said path.

2. A system for generating a measurable signal which is controlled by the rate and direction of flow of fluid in a well bore comprising means for producing an oscillatory output voltage having a temperature sensitive element mounted in a path of fluid flow in said well bore for maintaining said output voltage at a frequency dependent upon the temperature of said fluid adjacent thereto, heating means positioned in said path above said element to raise liquid adjacent thereto to an elevated temperature upon energization thereof to change said frequency upon liquid flow therefrom to said element, heating means in said path below said element to raise liquid adjacent thereto to an elevated temperature upon energization thereof to change said frequency upon liquid flow therefrom to said element, and means for selectively energizing one or the other of said heating means to control the frequency of said output voltage in dependence upon the direction and velocity of fluid flow in said path.

3. In a system for measuring flow of fluid in a well bore the combination which comprises means for producing an oscillatory output voltage, a temperature sensitive element mounted in a path of fluid flow in said well bore and coupled to said voltage producing means for controlling the frequency of said output voltage in dependence upon the temperature of said fluid adjacent thereto, heating means mounted in said path above said element, heating means mounted in said path below said element, means for selectively energizing first one and then the other of said heating means alternately to produce by heat transfer through said liquid to said element output voltages at frequencies which differ in proportion to the heat transferred from each said heating means to said element.

4. A system for measuring flow of fluid in a well bore which comprises means for producing an oscillatory output voltage having a temperature sensitive element mounted in a path of fluid flow in said well bore for controlling the frequency of said output voltage in depedence upon the temperature of fluids adjacent thereto, heating means mounted in said path above said element, heating means mounted in said path below said element, and circuit means extending from said output voltage means and said heating means outside said well bore and including control means for energizing first one and then the other of said heating means alternately to produce by heat transfer from said heating means to said element output voltages at frequencies which are proportional to the heat transferred thereto and means coupled to said circuit means for measuring said frequencies.

5. A system for measuring flow of fluid in a well bore which comprises means for producing an oscillatory output voltage having a temperature sensitive element mounted in a path of fluid flow in said well bore for controlling the frequency of said output voltage in dependence upon the temperature of fluids adjacent thereto, heating means mounted in said path above said element, heating means mounted in said path below said element, switching means in circuit with said heating means, and a circuit coupled to the output of said output voltage means and to said switching means extending outside said well bore and including means for measuring said frequencies and control means for said switching means selectively to energize first one and then the other of said heating means to produce by heat transfer through said liquid to said element output voltages at frequencies which are proportional to the heat transferred thereto.

6. An instrument for generating signals indicative of rate and direction of flow of fluids in a passage which comprises an elongated tubular case for insertion into said passage and having an unobstructed flow channel, an alternating current generator having temperature sensitive means mounted in said channel for controlling the frequency of the output of said generator in dependence upon the temperature of fluids adjacent thereto, a source of current, a switch connected to one terminal of said source and having at least two circuit completing positions, two circuits interconnecting the second terminal of said source and said two circuit completing positions, the first circuit including a heating element positioned in said flow channel and displaced therealong from said temperature sensitive means, the second circuit including like heating means in said flow channel displaced from said temperature sensitive means on the side opposite the first named heating means, and means for closing the circuit from said source selectively through said circuit completing positions to first one and then the other of said heating means correspondingly to vary said frequency in dependence upon the rate and direction of said fluid flow.

7. In a system for measuring the rate and direction of flow of fluids in a passage, the combination which comprises a control circuit extending into said passage and including a current source, two branch circuits connected in parallel to said control circuit, the first branch including a source of alternating current having temperature sensitive means mounted in said passage to control the frequency of the output thereof, the second branch including relay means having at least two circuit completing positions, two circuits connected to said two circuit completing positions, one including a heating element in said flow path adjacent said temperature sensitive means and the other including a like heating element in said flow path on the side of said temperature sensitive means opposite the first heating element, a switch in said control circuit, means responsive to closure of said switch for actuating said relay means to connect one or the other of said heating means in said second branch to said current source to produce in said control circuit output voltages from said source of alternating currents with said frequency dependent upon the rate and direction of fluid flow in said passage and means in said control circuit and outside said passage for measuring said frequency.

8. In a system for measuring the rate and direction of flow of fluids in a passage, the combination comprising a vacuum tube oscillator having in heat transfer relation with said fluids in said passage and connected in a frequency controlling network thereof temperature sensitive resistor means for producing output currents therefrom of frequency dependent upon the temperature of said fluids adjacent said resistor means, two fluid heating elements in substantially colinear array with said resistor means in the direction of fluid flow and on opposite sides of said temperature sensitive means, a source of current for energizing said heating elements, a switch in circuit with said source having two circuit completing positions, circuit means connecting both of said heating elements to said source and one of said elements to each of said circuit completing positions, and means outside said passage for actuating said switch selectively to energize one or the other of said heating elements for production of an output from said oscillator whose frequency is directly controlled by the rate and direction of fluid flow past said resistor means.

9. In a system for producing a measurable signal controlled by the rate and direction of flow of fluids in a passage, the combination which comprises two conductors extending into said passage and including a current source, two branch circuits in said passage connected in parallel to said two conductors, the first branch including an oscillator having temperature sensitive means in said passage connected in the frequency controlling network thereof, the second branch including relay means having at least two circuit completing positions, two circuits connected to said two circuit completing positions, one including a heating element in said flow path adjacent said temperature sensitive means and the other including a like heating element in said flow path on the side of said temperature sensitive means opposite the first heating element, a switch outside said passage and connected in circuit with said conductors, and means responsive to actuation of said switch for energizing said relay means to change the circuit through one output position to the other output position to connect one or the other of said heating means in said second branch to said current source to produce in said conductors alternating currents from said oscillator in said first branch dependent in frequency upon the rate and direction of fluid flow adjacent said temperature sensitive means.

10. An instrument for producing signals indicative of rate and direction of flow of fluids in a passage which comprises a source of direct current, an elongated tubular case for insertion into said passage and having an unobstructed flow channel and a liquid-tight compartment, an alternating current generator supplied by said source and positioned in said liquid-tight compartment, temperature sensitive means mounted outside said compartment in said flow channel and connected in a frequency controlling relation to said alternating current generator for controlling the frequency of the output of said generator in dependence upon the temperature of the fluids adjacent thereto, a switch connected to one terminal of said source and having three circuit completing positions, three circuits interconnecting the second terminal of said source and said three circuit completing positions, the first circuit including a heating element positioned in said flow channel displaced therealong from said temperature sensitive means, the second circuit including like heating means in said flow channel on the side of said temperature sensitive means opposite the first named heating means, and the third circuit including resistance means equal to the resistance of said heating means positioned in said compartment and insulated from said fluids, and relay means for selectively completing a circuit from said source parallel to said alternating current generator and through said switch first to said resistance means to permit establishment of a reference frequency output from said generator at a given level of current flow from said source and then in sequence to each of said heating means correspondingly to vary the frequency of the output from said generator in dependence upon the rate and direction of fluid flow in said passage and the normal temperature therein while maintaining constant said level of current flow from said source.

11. A system for determining the rate and direction of flow of fluids in a passage which comprises temperature sensitive means in said passage, means for selectively applying heat to said fluids upstream and downstream from said detecting means, means responsive to said temperature sensitive means for producing an oscillatory voltage dependent in frequency upon the temperature of said temperature sensitive means, and means for indicating the frequency of said oscillatory voltage.

References Cited in the file of this patent

UNITED STATES PATENTS

| | | |
|---|---|---|
| 1,156,638 | Simmons | Oct. 12, 1915 |
| 1,951,276 | Edwards | Mar. 13, 1934 |
| 2,197,564 | Yaglou | Apr. 16, 1940 |
| 2,437,449 | Ames, Jr., et al. | Mar. 9, 1948 |
| 2,447,816 | Rieber | Aug. 24, 1948 |
| 2,524,150 | Vincent | Oct. 3, 1950 |
| 2,549,812 | Hillman | Apr. 24, 1951 |